United States Patent
Li et al.

(10) Patent No.: US 12,521,023 B2
(45) Date of Patent: Jan. 13, 2026

(54) TEMPERATURE SELF-COMPENSATION INTERVENTIONAL OPTICAL FIBER PRESSURE GUIDEWIRE AND WIRELESS FFR MONITOR

(71) Applicant: Wuhan University of Technology, Hubei (CN)

(72) Inventors: Tianliang Li, Hubei (CN); Jianglin Zhu, Hubei (CN); Tao Huang, Hubei (CN); Haotian Zhou, Hubei (CN); Zichun Cao, Hubei (CN)

(73) Assignee: Wuhan University of Technology, Hubei (CN)

( * ) Notice: Subject to any disclaimer, the term of this patent is extended or adjusted under 35 U.S.C. 154(b) by 0 days.

(21) Appl. No.: 19/176,058

(22) Filed: Apr. 10, 2025

(65) Prior Publication Data
US 2025/0261865 A1    Aug. 21, 2025

(30) Foreign Application Priority Data
Nov. 21, 2024    (CN) .......................... 202411667573.X (51) Int. Cl.
*A61B 5/0205*    (2006.01)
*A61B 5/00*      (2006.01)
(Continued)

(52) U.S. Cl.
CPC ........ *A61B 5/02055* (2013.01); *A61B 5/0008* (2013.01); *A61B 5/6851* (2013.01);
(Continued)

(58) Field of Classification Search
CPC ... A61B 5/0004; A61B 5/0008; A61B 5/0017; A61B 5/0084; A61B 5/01;
(Continued)

(56) References Cited

U.S. PATENT DOCUMENTS

| | | | |
|---|---|---|---|
| 2011/0178413 A1* | 7/2011 | Schmitt | A61B 5/0084 600/478 |
| 2015/0141854 A1* | 5/2015 | Eberle | A61B 5/02154 600/488 |

(Continued)

FOREIGN PATENT DOCUMENTS

| | | | | |
|---|---|---|---|---|
| CN | 110196071 A | * | 9/2019 | ......... G01D 5/35312 |
| CN | 113884144 A | * | 1/2022 | ............. G01D 21/02 |

(Continued)

OTHER PUBLICATIONS

CN 113884144 A English Translation (Year: 2022).*
(Continued)

*Primary Examiner* — Charles A Marmor, II
*Assistant Examiner* — Andrew E Hoffpauir (57) ABSTRACT

A temperature self-compensation interventional optical fiber pressure guidewire includes: a first guidewire section, a second guidewire section, and a third guidewire section that are arranged in sequence and are hollow, and a fiber bragg grating (FBG)-Fabry-Perot (FP) cascaded optical fiber sensor. The first guidewire section is configured to guide the second guidewire section and the third guidewire section in a blood vessel; the second guidewire section and the third guidewire section are internally hollow and are communicated to each other. The FBG-FP cascaded optical fiber sensor is arranged inside the second guidewire section and extends towards an inside of the third guidewire section. The FBG-FP cascaded optical fiber sensor is configured to simultaneously measure a temperature signal and a pressure signal inside the blood vessel. The present invention is particularly applicable to measuring parameters of a region before and after stenosis inside the blood vessel.

7 Claims, 5 Drawing Sheets

(51) Int. Cl.
  *A61B 5/0215* (2006.01)
  *G02B 6/25* (2006.01)
(52) U.S. Cl.
  CPC .......... *A61B 5/7225* (2013.01); *A61B 5/7257* (2013.01); *A61B 5/742* (2013.01); *A61B 5/748* (2013.01); *A61B 5/02154* (2013.01); *G02B 6/25* (2013.01)
(58) Field of Classification Search
  CPC ............ A61B 5/02055; A61B 5/02154; A61B 5/02158; A61B 5/6851; A61B 5/6876; A61B 5/7225; A61B 5/725; A61B 5/7253; A61B 5/7257; A61B 5/742; A61B 7/748; G02B 6/25; G01B 11/18; G01D 21/02; G01K 11/3206; G06F 17/10
  See application file for complete search history.

(56) References Cited

U.S. PATENT DOCUMENTS

| | | | | |
|---|---|---|---|---|
| 2017/0188831 A1* | 7/2017 | Adler | ................... | A61B 8/4433 |
| 2019/0029523 A1* | 1/2019 | Belleville | ............. | A61M 25/09 |
| 2019/0307338 A1* | 10/2019 | Wright | ................... | A61M 25/09 |
| 2020/0245944 A1* | 8/2020 | Hilmersson | .......... | A61B 5/0215 |
| 2020/0345306 A1* | 11/2020 | Samuelsson | ......... | A61B 5/6852 |
| 2021/0038207 A1* | 2/2021 | Zhang | .................... | D03D 11/00 |
| 2021/0052173 A1* | 2/2021 | Desjardins | ............. | G01F 1/688 |
| 2024/0372309 A1 | 11/2024 | Kemp | | |

FOREIGN PATENT DOCUMENTS

| | | | | |
|---|---|---|---|---|
| CN | 114137273 A | | 3/2022 | |
| CN | 115487398 A | | 12/2022 | |
| CN | 117686009 A | | 3/2024 | |
| CN | 118533357 A | * | 8/2024 | ............... G02B 6/38 |
| KR | 100614006 B1 | * | 8/2006 | ............. G01B 21/32 |
| WO | WO-2016070099 A1 | * | 5/2016 | ........... A61B 5/6852 |

OTHER PUBLICATIONS

CN 110196071 A English Translation (Year: 2019).*
CN 118533357 A English Translation (Year: 2024).*
KR 100614006 B1 English Translation (Year: 2006).*

* cited by examiner

TEMPERATURE SELF-COMPENSATION INTERVENTIONAL OPTICAL FIBER PRESSURE GUIDEWIRE AND WIRELESS FFR MONITOR

TECHNICAL FIELD

The present invention relates to the technical field of optical fiber sensing, and in particular, to a temperature self-compensation interventional optical fiber pressure guidewire and a wireless fractional flow reserve (FFR) monitor.

BACKGROUND

The number of patients suffering from vascular diseases such as coronary heart diseases and peripheral arterial diseases in China has reached 330 million, becoming the leading cause of death among urban and rural residents. Moreover, the mortality rate continues to rise, posing a serious threat to public health and patient safety. In percutaneous coronary intervention, coronary angiography, intravascular ultrasound, and CT are commonly used diagnostic techniques for coronary artery stenosis in clinical practice. However, these methods are limited in acquiring functional information about vascular stenosis are very limited, and cannot effectively evaluate physiological functions of stenosis sites. In most cases, the degree of coronary artery stenosis still needs to be evaluated by relying on the diagnostic experience of a doctor. There are significant subjective human factors, which may easily lead to major medical accidents because of delay or exaggeration caused by underestimation or overestimation on the degree of coronary artery stenosis.

Fractional flow reserve (FFR) is a physiological and functional indicator used to assess the impact of the coronary artery stenosis on a blood flow. By measuring pressures at different positions within a coronary artery, namely, the ratio between the mean distal coronary pressure (Pd) beyond a stenosis and the mean aortic pressure (Pa) at the proximal segment during maximal hyperemia, it can be determined whether the stenosis caused by a plaque in a blood vessel is severe enough to require interventional treatment is determined. It is commonly used in clinical practice to evaluate whether critical lesion induces functional ischemia and guide revascularization in a coronary intervention surgery. Using a pressure guidewire to measure a blood flow pressure difference before and after the narrow lesions is a gold standard for clinical measurement of an FFR. At present, an electrical pressure guidewire is commonly used for measurement in clinical practice. Due to the presence of a large number of electromagnetic medical equipment in modern hospitals, the electrical pressure guidewire has the problems of drift and calibration failure due to electromagnetic interference. Furthermore, electrical components are also highly susceptible to blood erosion, which seriously affects the sensitivity and accuracy of the electrical components. An optical fiber sensor has received widespread attention in recent years due to its advantages of small size, high electromagnetic compatibility, good biocompatibility, high accuracy, and the like. The research on an optical fiber pressure sensor has been mature at home and abroad, but the application of the optical fiber pressure sensor in the medical field is not mature enough. Moreover, demodulation frequencies of existing optical fiber demodulation systems cannot meet real-time monitoring requirements for high-frequency signals, and most of the existing optical fiber demodulation systems use wired data transmission, which leads to defects that the wiring is complex, fiber bragg grating (FBG) and Fabry-Perot (F-P) cannot be subjected to simultaneous hybrid demodulation, and the like.

Therefore, based on the above situation, it is necessary to provide a temperature self-compensating interventional optical fiber pressure guidewire and a wireless FFR monitor to assist doctors in real-time monitoring of physiological parameters of patients, to timely learn about disease states of the patient and provide a reference data support for treatment plans.

SUMMARY

In view of this, the present invention provides a temperature self-compensation interventional optical fiber pressure guidewire and a wireless FFR monitor that implement synchronous monitoring on a temperature and a pressure through decoupling of a length of an F-P cavity and a wavelength of an FBG in an F-P cavity and fiber bragg grating cascaded structure, and are conveniently implanted into a blood vessel.

According to one aspect, the present invention provides a temperature self-compensation interventional optical fiber pressure guidewire, including: a first guidewire section, a second guidewire section, and a third guidewire section, sequentially arranged and each having a hollow interior, and a fiber bragg grating (FBG)-Fabry-Perot (FP) cascaded optical fiber sensor, wherein the first guidewire section is configured to guide the second guidewire section and the third guidewire section in a blood vessel;

the second guidewire section and the third guidewire section are internally hollow and are communicated to each other;

the FBG-FP cascaded optical fiber sensor is arranged inside the second guidewire section and extends towards an inside of the third guidewire section; the FBG-FP cascaded optical fiber sensor includes a multimode optical fiber, a hollow optical fiber, and a single-mode optical fiber which are arranged in sequence; an FBG is arranged on the single-mode optical fiber; and the FBG-FP cascaded optical fiber sensor is configured to simultaneously measure a temperature signal and a pressure signal inside the blood vessel.

Based on the above technical solution, preferably, a method for preparing the FBG-FP cascaded optical fiber sensor includes the following steps:

S1: peeling off coating layers of both the single-mode optical fiber and the hollow optical fiber with the FBG, and cutting the single-mode optical fiber and the hollow optical fiber, wherein after cutting, an end surface of the single-mode optical fiber is 2 to 5 mm away from the FBG; placing the single-mode optical fiber and the hollow optical fiber into a fusion splicer for fusion splicing;

S2: reserving the hollow optical fiber to a specific length, and flattening one end of the hollow optical fiber away from the single-mode optical fiber with the FBG;

S3: placing the flattened end of the hollow optical fiber and the multimode optical fiber into the fusion splicer for fusion splicing, and forming an F-P cavity inside the hollow optical fiber;

S4: cutting off one end of the multimode optical fiber away from the hollow optical fiber, and reserving the multimode optical fiber to a specific length;

S5: grinding an end portion of the multimode optical fiber away from the hollow optical fiber until the multimode optical fiber is ground to 3 to 4 µm; and S6: soaking the ground multimode optical fiber in hydrofluoric acid to cause the hydrofluoric acid to corrode the multimode optical fiber for a plurality of times until the multimode optical fiber is corroded to 1 to 2 µm, to obtain the FBG-FP cascaded optical fiber sensor.

Preferably, outer diameters of the first guidewire section, the second guidewire section, and the third guidewire section are identical, but inner diameters are not completely identical.

According to another aspect, the present invention provides a wireless fractional flow reserve (FFR) monitor, including the above temperature self-compensating interventional optical fiber pressure guidewire, and further including a power module, an optical path module, a circuit module, a signal processing module, a wireless communication module, and a touch display module, wherein the power module is electrically connected to the optical path module, the circuit module, the signal processing module, the wireless communication module, and the touch display module respectively, to provide working power;

the optical path module provides a sweep-frequency optical signal for the temperature self-compensation interventional optical fiber pressure guidewire and receives an optical signal output by the temperature self-compensation interventional optical fiber pressure guidewire;

the circuit module is electrically connected to the optical path module; the circuit module is further optically connected to the temperature self-compensation interventional optical fiber pressure guidewire, and is configured to drive the optical path module to work and receive the optical signal output by the temperature self-compensation interventional optical fiber pressure guidewire, and performs photoelectric conversion and signal preprocessing on the optical signal;

the signal processing module is electrically connected to an output end of the circuit module, and is configured to perform steps of data smoothing, adaptive threshold segmentation of an FBG/F-P spectrum, obtaining of a center wavelength of an FBG spectrum based on a peak detection algorithm, and calculation a cavity length of the F-P cavity based on a cavity length demodulation algorithm on a preprocessed signal output by the circuit module;

the wireless communication module is respectively communicatively connected to an output end of the signal processing module and the touch display module, and sends the center wavelength, obtained by the signal processing module, of the FBG spectrum of the FBG-FP cascaded optical fiber sensor and the cavity length, obtained by the signal processing module, of the F-P cavity of the FBG-FP cascaded optical fiber sensor to the touch display module through wireless transmission; and the touch display module receives data sent by the wireless communication module, displays, in real time, the center wavelength of the FBG spectrum and the cavity length of the F-P cavity, which are output and demodulated by the FBG-FP cascaded optical fiber sensor, further calculates a temperature and pressure inside a blood vessel according to a sensitivity of the FBG-FP cascaded optical fiber sensor, displays and outputs the temperature and the pressure.

Based on the above technical solution, preferably, the optical path module includes a superluminescent light-emitting diode (SLED) laser device, an optical isolator, a tunable FP filter, an optical splitter, and at least one optical circulator;

an output end of the SLED laser device is optically connected to an input end of the optical isolator to output broad-spectrum laser;

an output end of the optical isolator is optically connected to an input end of the tunable FP filter;

an output end of the tunable FP filter is connected to an input end of the optical splitter, to tune the input broad-spectrum laser into a periodic narrowband sweep-frequency pulse light source and input the light source into the optical splitter;

an output end of the optical splitter is connected to a first end of the at least one optical circulator, to divide the sweep-frequency pulse light source output by the tunable FP filter into a plurality of components for outputting;

the at least one optical circulator includes a first end, a second end, and a third end; the first end is unidirectionally communicated to the second end; the second end is unidirectionally communicated to the third end; the second end of the at least one optical circulator is in optical communication with the FBG-FP cascaded optical fiber sensor in the temperature self-compensation interventional optical fiber pressure guidewire in a one-to-one correspondence manner; the third end of the at least one optical circulator is in optical communication with a third end of the circuit module; and the second end of the at least one optical circulator outputs the sweep-frequency pulse light source into the FBG-FP cascaded optical fiber sensor, and outputs a reflected light signal of the FBG-FP cascaded optical fiber sensor into the circuit module through the third end of the at least one optical circulator.

Preferably, the circuit module includes a photodetector, a signal conditioning circuit, a signal acquisition circuit, and a constant current drive and constant temperature control circuit;

the photodetector is optically connected to the third end of the at least one optical circulator to convert the reflected light signal of the FBG-FP cascaded optical fiber sensor into an electrical signal; an output end of the photodetector is electrically connected to an input end of the signal conditioning circuit;

the signal conditioning circuit is configured to amplify and filter the electrical signal output by the photodetector; an output end of the signal conditioning circuit is electrically connected to an input end of the signal acquisition circuit;

the signal acquisition circuit performs analog-to-digital conversion on an amplified and filtered electrical signal; an output end of the signal acquisition unit is electrically connected to an input end of the signal processing module; the signal conditioning circuit and the signal acquisition circuit jointly preprocess the electrical signal;

the constant current drive and constant temperature control circuit is connected to the SLED laser device to perform constant current drive and constant temperature control on the laser device, so that the SLED laser device achieves stable outputting; and the constant current drive and constant temperature control circuit is further communicatively connected to the signal processing module.

Further preferably, the signal processing module includes a main control chip, and working content of the main control chip is:
A) data smoothing: a moving average filtering method is selected for data smoothing and filtering, and a calculation formula is as follows:

$$y[n] = \frac{1}{M} \sum_{k=0}^{N-1} x[n-k],$$

wherein x[n−k] corresponds to a signal sequence containing N pieces of data; k=0, 1 . . . . N−1, wherein n is data to be smoothed; in moving average filtering performs filtering by sliding a window with a fixed length of M on the signal sequence and calculating an average value of data within the window, to eliminate noise of a preprocessed electrical signal;
B) adaptive threshold segmentation of an FBG/F-P spectrum: in order to separate an FBG spectrum in a reflected spectrum of the FBG-FP cascaded optical fiber sensor from an F-P spectrum in the reflected spectrum of the FBG-FP cascaded optical fiber sensor, hilbert transform is selected to segment a spectral peak region of FBG spectrum data to respectively obtain the FBG spectrum and the F-P spectrum;
C) obtaining of a center wavelength of the FBG spectrum based on a peak-detection algorithm: a Gaussian polynomial fitting method is used to identify a peak value of the FBG spectrum corresponding to the reflected light signal in the FBG-FP cascaded optical fiber sensor; and
D) calculation of a cavity length of the F-P cavity based on a cavity length demodulation algorithm: a demodulation algorithm that combines fast Fourier transform with all-phase information to calculate the cavity length of the optical fiber F-P cavity.

Further preferably, the Gaussian polynomial fitting method is used to identify the peak value of the FBG spectrum corresponding to the reflected light signal in the FBG-FP cascaded optical fiber sensor; a Gaussian polynomial for the peak value of the FBG spectrum is:

$$I(\lambda) = I_0 \exp\left[-4\ln 2 \left(\frac{\lambda - \lambda_b}{\Delta \lambda_b}\right)^2\right],$$

wherein $I_0$ is an optical intensity of reflected light of the FBG-FP cascaded optical fiber sensor; $\lambda$ is a wavelength of light emitted by the optical path module; $\lambda_b$ is a wavelength of the reflected light signal; $\Delta\lambda_b$ is a 3 dB bandwidth of the reflected light signal; logarithms are taken from both sides the Gaussian polynomial to obtain $$\ln I(\lambda) = -\left(4\ln \frac{\lambda_b^2}{\Delta\lambda_b^2} - \ln I_0\right) + 8\ln 2 \frac{\lambda_b}{\Delta\lambda_b^2}\lambda - 4\ln 2 \frac{1}{\Delta\lambda_b^2}\lambda^2,$$

which is rewritten as general polynomials:

$$\ln I(\lambda) = P(\lambda) = p_2 \lambda^2 + p_1 \lambda + p_0,\ p_2 = -4\ln 2 \frac{1}{\Delta\lambda_b^2},$$

$$p_1 = 8\ln 2 \frac{\lambda_b}{\Delta\lambda_b^2},\ p_0 = -\left(4\ln \frac{\lambda_b^2}{\Delta\lambda_b^2} - \ln I_0\right);$$

when a first derivative of the polynomial is zero which is calculated by using the least square method, a peak value position of the FBG spectrum is obtained by using $$\lambda_b = \frac{-p_1}{2p_2}.$$

Still further preferably, specific content of selecting the demodulation algorithm that combines fast Fourier transform with all-phase information to calculate the cavity length of the optical fiber F-P cavity is:
the F-P spectrum is obtained by removing the FBG spectrum from a reflection spectrum in the FBG-FP cascaded optical fiber sensor; an interference light signal of the F-P cavity is:

$$I_R = 2R\left[1 - \cos\left(\frac{4\pi n_0 L}{\lambda} + \varphi_0\right)\right]I_0;$$

an optical frequency ν=c/λ is used; the above formula is rewritten as $$I_R = 2R\left[1 - \cos\left(\frac{4\pi n_0 L\nu}{\lambda} + \varphi_0\right)\right]I_0,$$

wherein R is a reflectivity of two ends of the F-P cavity; c is a speed of light; L is the cavity length of the F-P cavity; $n_0$ is a refractive index of a medium in the F-P cavity; $\varphi_0$ is an initial phase of the F-P spectrum; fast Fourier transform is performed on a formula of interference light signal to obtain:

$$F(j\omega) = 2\pi R\left[2\delta(\Omega) - \delta\left(\Omega + \frac{4\pi n_0 L\nu}{c}\right) - \delta\left(\Omega - \frac{4\pi n_0 L\nu}{c}\right)\right],$$

wherein jω is a frequency domain independent variable; a center point of a function is located at zero and $$\Omega = \pm \frac{4\pi n_0 L\nu}{c};$$

an angular frequency is set to $$\Omega_1 = \frac{4\pi n_0 L\nu}{c};$$

a spectrum in the frequency domain is discretized to further obtain:

$$I(n) = \left\{2R\left[1 - \cos\left(n_0\left(Lk_0 + \frac{L\Delta kn}{N}\right) + \varphi_0\right)\right]\right\}I_0,$$

wherein $k_0$ represents a wavenumber corresponding to a starting wavelength of the F-P spectrum, within a wavenumber range of $\Delta k=k_1-k_0$; k represents an ending wavenumber of the F-P spectrum; discrete Fourier transform is performed on a discretization formula:

$$F(m) = \sum_{0}^{N-1} 2R \cdot \exp\left[i\left(n_0\left(Lk_0 + \frac{L\Delta kn}{N}\right) + \varphi_0\right)\right] \cdot \exp\left(-i\frac{2\pi mn}{N}\right),$$

m=0, 1, 2, . . . . N−1 to find an abscissa $m_1$ corresponding to |F(m)| equal to an extreme point; $m_1$=0, 1, 2, . . . . N−1, obtaining a frequency $$\omega_1 = \frac{2\pi m_1}{N} = \Omega_1 \Delta v$$

and obtaining a cavity length calculation formula $$L = \frac{cm_1}{2n_0 N \Delta v};$$

a wavelength interval is $$\Delta v = \frac{c}{\lambda} - \frac{c}{\lambda + \delta\lambda} \approx \frac{c\delta\lambda}{\lambda_B^2};$$

$\delta\lambda$ is a frequency parameter; $\lambda_B$ represents the center wavelength of the light emitted by the optical path module; and the cavity length calculation formula is rewritten as $$L = \frac{m_1 \lambda_B^2}{2n_0 N \delta\lambda}.$$

Preferably, the wireless communication module includes an ESP32 controller; and the ESP32 main controller is configured to wirelessly transmit. the center wavelength of the FBG spectrum and the cavity length of the F-P cavity, which are obtained by the signal processing module, to the touch display module through a message queuing telemetry transport (MQTT) protocol.

Compared with the prior art, the temperature self-compensation interventional optical fiber pressure guidewire and the wireless FFR monitor that are provided in the present invention have the following beneficial effects:

(1) In the present invention, by using the F-P cavity and FBG cascaded structure, a temperature and a pressure are synchronously monitored through decoupling of a cavity length of an F-P cavity and a wavelength of an FBG, which effectively eliminates the impact of the temperature on a change in the cavity length of the F-P cavity. In addition, the present invention can quickly demodulate a reflected light signal of an FBG/F-P composite sensor, can increase a demodulation frequency of a demodulation system, implement FBG/F-P hybrid demodulation, and achieve multi-parameter monitoring, and is particularly applicable to acquiring lesion parameters of a stenosis region inside a blood vessel.

(2) The present invention uses an optical fiber grinding and corrosion process to combine a single-mode optical fiber, a hollow optical fiber, and a multimode optical fiber into an FBG-FP cascaded optical fiber sensor. A temperature is measured through the FBG, and temperature compensation is performed on the F-P cavity. The sensor can effectively improve pressure sensitivity of the optical fiber F-P cavity.

BRIEF DESCRIPTION OF DRAWINGS

To describe the technical solutions in the embodiments of the present invention or in the related art more clearly, the following briefly introduces the accompanying drawings for describing the embodiments or the related art. Apparently, the accompanying drawings in the following description show merely some embodiments of the present invention, and a person of ordinary skill in the art may still derive other drawings from the accompanying drawings without requiring inventive efforts.

Numerals in the accompanying drawings: 1: temperature self-compensation interventional optical fiber pressure guidewire; 2: quick connector; 3: wireless demodulator; 101: first guidewire section; 102: second guidewire section; 103: third guidewire section; 104: FBG-FP cascaded optical fiber sensor; 201: single-mode optical fiber; 202: hollow optical fiber; 203: multimode optical fiber; 31: power module; 32: optical path module; 33: circuit module; 34: signal processing module; 35: wireless communication module; 36: touch display module; 321: SLED laser device; 322: optical isolator; 323: tunable FP filter; 324: optical splitter; 325: optical circulator; 331: photodetector; 332: signal conditioning circuit; 333: signal acquisition circuit; and 334: constant current drive and constant temperature control circuit.

DETAILED DESCRIPTION

To make the objectives, technical solutions, and advantages of the embodiments of the present invention clearer, the technical solutions in the embodiments of the present invention are clearly and completely described below with reference to the accompanying drawings in the embodiments of the present invention. Apparently, the described embodiments are merely some embodiments of the present invention, rather than all of the embodiments. All other embodiments obtained by a person of ordinary skill in the art based on the embodiments of present disclosure without making inventive efforts shall fall within the protection scope of present disclosure.

Figure 2:
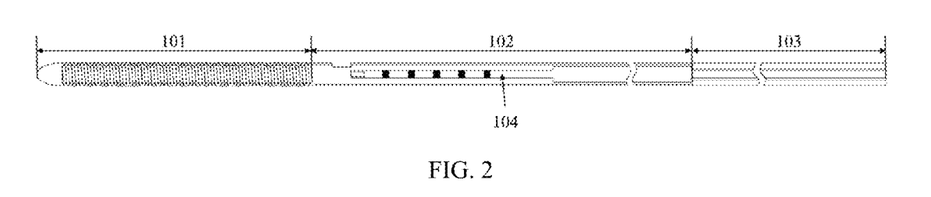
FIG. 2 is a structural diagram of a guidewire in a temperature self-compensation interventional optical fiber pressure guidewire and a wireless FFR monitor according to the present invention.

An existing electrical pressure guidewire usually has the problems of poor anti-electromagnetic interference capability, drift, calibration failure, and the like. An existing demodulation system has the problems of low frequency, short wired data transmission distance, independent demodulation of an FBG or an F-P cavity, and the like. In view of this, as shown in FIG. 2, the present invention provides a temperature self-compensation interventional optical fiber pressure guidewire, including: a first guidewire section 101, a second guidewire section 102, and a third guidewire section 103, sequentially arranged and each having a hollow interior, and an FBG-FP cascaded optical fiber sensor 104.

The first guidewire section 101 is configured to guide the second guidewire section 102 and the third guidewire section 103 in a blood vessel.

The second guidewire section 102 and the third guidewire section 103 are internally hollow and are communicated to each other.

The FBG-FP cascaded optical fiber sensor 104 is arranged inside the second guidewire section 102 and extends towards an inside of the third guidewire section 103. The FBG-FP cascaded optical fiber sensor 104 includes a multimode optical fiber 203, a hollow optical fiber, and a single-mode optical fiber 201 which are arranged in sequence. An FBG is arranged on the single-mode optical fiber 201. The FBG-FP cascaded optical fiber sensor 104 is configured to simultaneously measure a temperature signal and a pressure signal inside the blood vessel.

With small diameters, the first guidewire section 101, the second guidewire section 102, and the third guidewire section 103 can guide the FBG-FP cascaded optical fiber sensor 104 inside the blood vessel to move forward or withdraw. A diameter of the FBG-FP cascaded optical fiber sensor 104 is less than an inner diameter of the first guidewire section 101, the second guidewire section 102, and the third guidewire section 103.

In a preferred embodiment, outer diameters of the first guidewire section 101, the second guidewire section 102, and the third guidewire section 103 are identical, but inner diameters are not completely identical. Specifically, the first guidewire section 101 has a diameter of 0.36 mm and a length of 30 mm. The second guidewire section 102 has the inner diameter of 0.3 mm, the outer diameter of 0.36 mm, and a length of 300 to 500 mm. The third guidewire section 103 has the inner diameter of 0.18 mm, the outer diameter of 0.36 mm, and a length of 1,000 to 1,500 mm.

Figure 3:
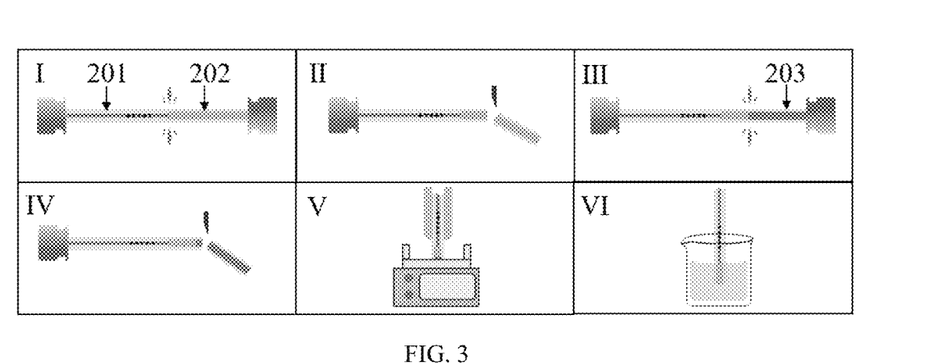
FIG. 3 is a flowchart of preparation of an FBG-FP cascaded optical fiber sensor in a temperature self-compensation interventional optical fiber pressure guidewire and a wireless FFR monitor according to the present invention.

As shown in FIG. 3, a method for preparing the above FBG-FP cascaded optical fiber sensor 104 mainly involves four operations: fusion splicing, cutting, grinding, and corrosion, including the following steps:

S1: Peel off coating layers of both the single-mode optical fiber 201 and the hollow optical fiber 202 with the FBG, and cut the single-mode optical fiber 201 and the hollow optical fiber 202, wherein after cutting, an end surface of the single-mode optical fiber 201 is 2 to 5 mm away from the FBG, and the hollow optical fiber without the coating layer has a length of about 10 mm; and place the single-mode optical fiber 201 and the hollow optical fiber 202 into a fusion splicer for fusion splicing. Refer to I on the upper left side in FIG. 3.

S2: Reserve the hollow optical fiber to a specific length, and flatten one end of the hollow optical fiber away from the single-mode optical fiber 201 with the FBG. Refer to II on the upper middle side in FIG. 3.

S3: Place the flattened end of the hollow optical fiber and the multimode optical fiber 203 into the fusion splicer for fusion splicing, and form an F-P cavity inside the hollow optical fiber. Refer to III on the upper right side in FIG. 3.

S4: Cut off one end of the multimode optical fiber 203 away from the hollow optical fiber, and reserve the multimode optical fiber 203 to a specific length. Refer to IV on the lower left corner in FIG. 3.

S5: Grind an end portion of the multimode optical fiber 203 away from the hollow optical fiber until the multimode optical fiber 203 is ground to 3 to 4 μm.

S6: Soak the ground multimode optical fiber 203 in hydrofluoric acid to cause the hydrofluoric acid to corrode the multimode optical fiber 203 for a plurality of times until the multimode optical fiber 203 is corroded to 1 to 2 μm, to obtain the FBG-FP cascaded optical fiber sensor. For a process of repeated soaking and grinding, refer to V on the lower side in FIG. 3 and IV on the lower right side in FIG. 3.

The temperature self-compensation interventional optical fiber pressure guidewire measures a temperature through the FBG, and performs temperature compensation on the F-P cavity. When the FBG is affected by both temperature and strain, a change in a drift of a center wavelength of the FBG is $\Delta\lambda=(1-\rho_e)\Delta\varepsilon+(\alpha+\eta)\Delta T$, where $\Delta\lambda$ is the drift of the wavelength of the FBG; $\rho_e$ is an effective elasto-optical coefficient; $\Delta\varepsilon$ is a pressure variable of the FBG; $\alpha$ is a thermal expansion coefficient of the FBG; $\eta$ is a thermo-optical coefficient of the FBG; and $\Delta T$ is a temperature variable. The FBG in the temperature self-compensation interventional optical fiber pressure guidewire is arranged loosely, so that the FBG is not affected by the pressure, namely, the drift of the center wavelength of the FBG is only related to the temperature, which is $\Delta\lambda=S_1\Delta T$, wherein $S_1=\alpha+\eta$ is a temperature sensitivity of the FBG. The optical fiber pressure guidewire measures a pressure through the F-P cavity. The F-P cavity may be affected by both the temperature and the pressure, an expression of which is $\Delta L=S_2\Delta P+S_3\Delta T$, where $\Delta L$ is a variable of the cavity length of the F-P cavity; $S_2$ is a pressure sensitivity of the F-P cavity; $S_3$ is a temperature sensitivity of the F-P cavity; $\Delta P$ is a pressure variable; and $\Delta T$ is a temperature variable. According to the above formulas, a relationship of the temperature, the pressure, the drift of the wavelength of the FBG, and the variable of the cavity length of the F-P cavity may be obtained:

$$\begin{bmatrix}\Delta\lambda\\ \Delta L\end{bmatrix}=\begin{bmatrix}0 & S_1\\ S_2 & S_3\end{bmatrix}\begin{bmatrix}\Delta P\\ \Delta T\end{bmatrix}.$$

After the sensitivities are determined, the drift of the center wavelength of the FBG and the variable of the cavity length of the F-P cavity are obtained. By decoupling through the above matrix, a temperature and a pressure inside the blood vessel can be obtained.

Figure 1:
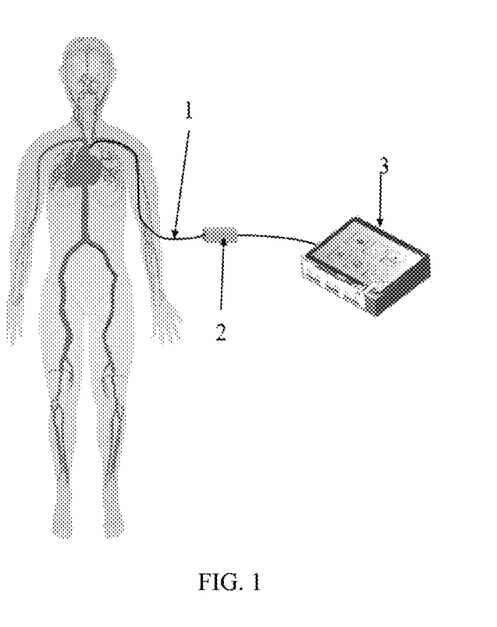
FIG. 1 is a schematic system diagram of a temperature self-compensation interventional optical fiber pressure guidewire and a wireless FFR monitor according to the present invention.

According to another aspect, the present invention provides a wireless FFR monitor. The monitor mainly includes three parts. As shown in FIG. 1, numeral 1 in the figure represents a temperature self-compensation interventional optical fiber pressure guidewire; numeral 2 represents a quick connector; and numeral 3 represents a wireless demodulator outside a human body. The wireless demodulator 3 includes a power module 31, an optical path module 32, a circuit module 33, a signal processing module 34, a wireless communication module 35, and a touch display module 36.

Figure 4:
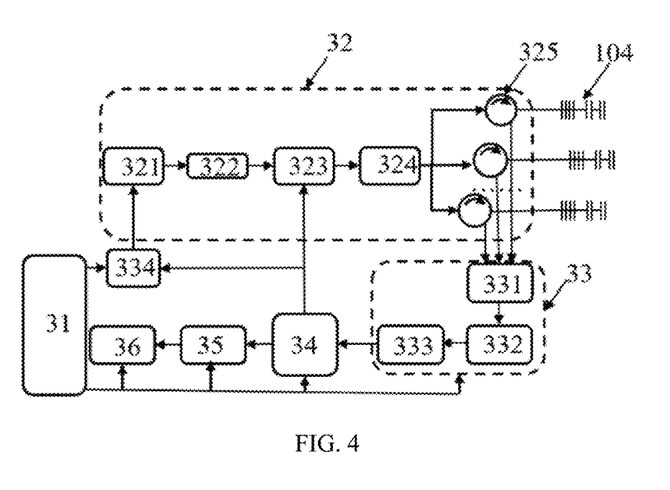
FIG. 4 is a schematic diagram of a system structure of a wireless FFR monitor in a temperature self-compensation interventional optical fiber pressure guidewire and a wireless FFR monitor according to the present invention.

The power module 31 is electrically connected to the optical path module 32, the circuit module 33, the signal processing module 34, the wireless communication module 35, and the touch display module 36 respectively, to provide working power.

The optical path module 32 provides a sweep-frequency optical signal for the temperature self-compensation interventional optical fiber pressure guidewire and receives an optical signal output by the temperature self-compensation interventional optical fiber pressure guidewire.

The circuit module 33 is electrically connected to the optical path module 32. The circuit module 33 is further optically connected to the temperature self-compensation interventional optical fiber pressure guidewire, and is configured to drive the optical path module 32 to work and receive the optical signal output by the temperature self-compensation interventional optical fiber pressure guidewire, and performs photoelectric conversion and signal preprocessing on the optical signal.

The signal processing module 34 is electrically connected to an output end of the circuit module 33, and is configured to perform steps of data smoothing, adaptive threshold segmentation of an FBG/F-P spectrum, obtaining of a center wavelength of an FBG spectrum based on a peak detection algorithm, and calculation a cavity length of the F-P cavity based on a cavity length demodulation algorithm on a preprocessed signal output by the circuit module 33.

The wireless communication module 35 is respectively communicatively connected to an output end of the signal processing module 34 and the touch display module 36, and sends the center wavelength, obtained by the signal processing module 34, of the FBG spectrum of the FBG-FP cascaded optical fiber sensor and the cavity length, obtained by the signal processing module 34, of the F-P cavity of the FBG-FP cascaded optical fiber sensor to the touch display module 36 through wireless transmission. The wireless communication module 35 includes an ESP32 controller. The ESP32 main controller is configured to wirelessly transmit the center wavelength of the FBG spectrum and the cavity length of the F-P cavity, which are obtained by the signal processing module 34, to the touch display module 36 through an MQTT protocol.

The touch display module 36 receives data sent by the wireless communication module 35, displays, in real time, the center wavelength of the FBG spectrum and the cavity length of the F-P cavity, which are output and demodulated by the FBG-FP cascaded optical fiber sensor, further calculates a temperature and pressure inside a blood vessel according to a sensitivity of the FBG-FP cascaded optical fiber sensor, displays and outputs the temperature and the pressure. After the packaging of the temperature self-compensation interventional optical fiber pressure guidewire is completed, parameters such as an FBG temperature sensitivity and F-P temperature and pressure sensitivities of the FBG-FP cascaded optical fiber sensor are measured, and a two-dimensional code is generated according to these parameters. When the pressure guidewire is used to measure an FFR, the two-dimensional code corresponding to the pressure guidewire is scanned to obtain the sensitivity parameters which are input to the touch display module 36 for calculation of the temperature and pressure inside the blood vessel.

The optical path module 32 includes an SLED laser device 321, an optical isolator 322, a tunable FP filter 323, an optical splitter 324, and at least one optical circulator 325.

An output end of the SLED laser device 321 is optically connected to an input end of the optical isolator 322 to output broad-spectrum laser.

An output end of the optical isolator 322 is optically connected to an input end of the tunable FP filter 323.

An output end of the tunable FP filter 323 is connected to an input end of the optical splitter 324, and is configured to tune the input broad-spectrum laser into a periodic narrow-band sweep-frequency pulse light source and input the light source into the optical splitter 324.

An output end of the optical splitter 324 is connected to a first end of the at least one optical circulator 325, and is configured to divide the sweep-frequency pulse light source output by the tunable FP filter 323 into a plurality of components for outputting. The optical splitter 324 may divide the light source into a plurality of components as needed for simultaneous outputting, thus achieving simultaneous multichannel demodulation.

The at least one optical circulator 325 includes a first end, a second end, and a third end. The first end is unidirectionally communicated to the second end. The second end is unidirectionally communicated to the third end. The second end of the at least one optical circulator 325 is in optical communication with the FBG-FP cascaded optical fiber sensor 104 in the temperature self-compensation interventional optical fiber pressure guidewire in a one-to-one correspondence manner. The third end of the at least one optical circulator 325 is in optical communication with a third end of the circuit module 33. The second end of the at least one optical circulator 325 outputs the sweep-frequency pulse light source into the FBG-FP cascaded optical fiber sensor 104, and outputs a reflected light signal of the FBG-FP cascaded optical fiber sensor 104 into the circuit module 33 through the third end of the at least one optical circulator 325. There is a unidirectional passing characteristic between adjacent ports of the optical circulator. This belongs to the common general knowledge in the art.

The circuit module 33 includes a photodetector 331, a signal conditioning circuit 332, a signal acquisition circuit 333, and a constant current drive and constant temperature control circuit 334.

The photodetector 331 is optically connected to the third end of the at least one optical circulator 325 to convert the reflected light signal of the FBG-FP cascaded optical fiber sensor 104 into an electrical signal. An output end of the photodetector 331 is electrically connected to an input end of the signal conditioning circuit 332. The photodetector 331 can be implemented by using a common photoelectric converter.

The signal conditioning circuit 332 is configured to amplify and filter the electrical signal output by the photodetector 331. An output end of the signal conditioning circuit 332 is electrically connected to an input end of the signal acquisition circuit 333. The signal conditioning circuit 332 can be implemented by using a peripheral filtering circuit composed of a power amplifier and circuit device.

The signal acquisition circuit 333 performs analog-to-digital conversion on an amplified and filtered electrical signal. An output end of the signal acquisition unit is electrically connected to an input end of the signal processing module 34. The signal conditioning circuit 332 and the signal acquisition circuit 333 jointly preprocess the electrical signal. The signal acquisition circuit 333 can be implemented by using an AD conversion chip.

The constant current drive and constant temperature control circuit 334 is connected to the SLED laser device 321 to perform constant current drive and constant temperature control on the laser device, so that the SLED laser device 321 achieves stable outputting. The constant current drive and constant temperature control circuit 334 is further communicatively connected to the signal processing module 34. The constant current drive and constant temperature control circuit 334 can be implemented by using a constant current power source and a heat exchanger.

Figure 5:
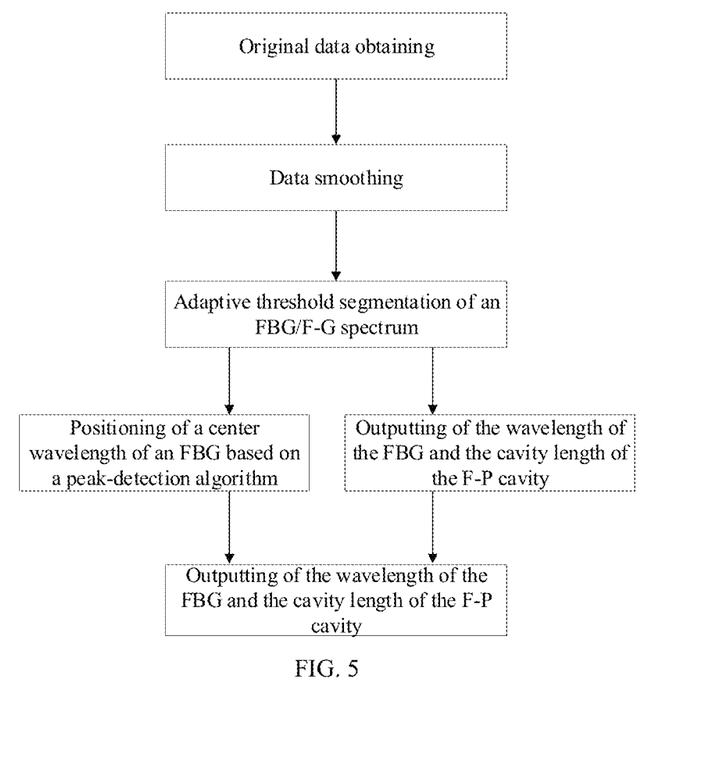
FIG. 5 is a flowchart of processing of a spectral signal of a sensor in a temperature self-compensation interventional optical fiber pressure guidewire and a wireless FFR monitor according to the present invention.

The signal processing module 34 includes a main control chip. The main control chip can use a field programmable gate array (FPGA), working content of which is:
A) data smoothing: a moving average filtering method is selected for data smoothing and filtering, and a calculation formula is as follows:

$$y[n] = \frac{1}{M}\sum_{k=0}^{N-1}x[n-k],$$

wherein x[n−k] corresponds to a signal sequence containing N pieces of data; k=0, 1 . . . . N−1, wherein n is data to be smoothed; in moving average filtering performs filtering by sliding a window with a fixed length of M on the signal sequence and calculating an average value of data within the window, to eliminate noise of a preprocessed electrical signal;

The data smoothing is the first step for processing an original signal, which aims to eliminate noise of the output original signal, smooth the original signal, and reduce an error in peak-detection accuracy. This embodiment uses the moving average filtering method to perform the data smoothing and filtering. The moving average filtering method is a data smoothing mode about time domain.

B) Adaptive threshold segmentation of an FBG/F-P spectrum: In order to separate an FBG spectrum in a reflected spectrum of the FBG-FP cascaded optical fiber sensor 104 from an F-P spectrum in the reflected spectrum of the FBG-FP cascaded optical fiber sensor 104, hilbert transform is selected to segment a spectral peak region of FBG spectrum data to respectively obtain the FBG spectrum and the F-P spectrum. The adaptive threshold segmentation can reduce a subsequent data processing amount and increase a data processing speed. Each wave crest of a smoothed spectrogram is located between two extreme points obtained after hilbert transform, and a phase shift of 90° occurs in a phase. In addition, left and right segmentation points of each spectral peaks of the smoothed spectrogram correspond to two extreme points obtained after hilbert transform, so that adaptive segmentation of the peak region of a spectral signal can be achieved.

C) Obtaining of a center wavelength of the FBG spectrum based on a peak-detection algorithm: For the reflected spectrum of the FBG, light intensities around the center wavelength of the FBG are in Gaussian symmetric distribution. Therefore, a Gaussian polynomial fitting method is used to identify a peak value of the FBG spectrum corresponding to the reflected light signal in the FBG-FP cascaded optical fiber sensor 104.

Specifically, a Gaussian polynomial for the peak value of the FBG spectrum is:

$$I(\lambda) = I_0 \exp\left[-4\ln 2\left(\frac{\lambda - \lambda_b}{\Delta\lambda_b}\right)^2\right],$$

where $I_0$ is an optical intensity of reflected light of the FBG-FP cascaded optical fiber sensor 104; λ is a wavelength of light emitted by the optical path module 32; $\lambda_b$ is a wavelength of the reflected light signal; $\Delta\lambda_b$ is a 3 dB bandwidth of the reflected light signal; logarithms are taken from both sides the Gaussian polynomial to obtain $$\ln I(\lambda) = -\left(4\ln\frac{\lambda_b^2}{\Delta\lambda_b^2} - \ln I_0\right) + 8\ln 2\frac{\lambda_b}{\Delta\lambda_b^2}\lambda - 4\ln 2\frac{1}{\Delta\lambda_b^2}\lambda^2,$$

which is rewritten as general polynomials:

$$\ln I(\lambda) = P(\lambda) = p_2\lambda^2 + p_1\lambda + p_0,$$

$$p_2 = -4\ln 2\frac{1}{\Delta\lambda_b^2},$$

$$p_1 = 8\ln 2\frac{\lambda_b}{\Delta\lambda_b^2},$$

$$p_0 = -\left(4\ln\frac{\lambda_b^2}{\Delta\lambda_b^2} - \ln I_0\right);$$

when a first derivative of the polynomial is zero which is calculated by using the least square method, a peak value position of the FBG spectrum is obtained by using $$\lambda_b = \frac{-p_1}{2p_2}.$$

D) calculation of a cavity length of the F-P cavity based on a cavity length demodulation algorithm: a demodulation algorithm that combines fast Fourier transform with all-phase information to calculate the cavity length of the optical fiber F-P cavity.

Specific content: The F-P spectrum is obtained by removing the FBG spectrum from a reflection spectrum in the FBG-FP cascaded optical fiber sensor 104; an interference light signal of the F-P cavity is:

$$I_R = 2R[1 - \cos(\frac{4\pi n_0 L\upsilon}{\lambda} + \varphi_0)]I_0;$$

an optical frequency ν=c/λ is used; the above formula is rewritten as $$I_R = 2R[1 - \cos(\frac{4\pi n_0 L\upsilon}{\lambda} + \varphi_0)]I_0,$$

wherein R is a reflectivity of two ends of the F-P cavity; c is a speed of light; L is the cavity length of the F-P cavity; $n_0$ is a refractive index of a medium in the F-P cavity; $\varphi_0$ is an initial phase of the F-P spectrum; fast Fourier transform is performed on a formula of interference light signal to obtain:

$$F(j\omega) = 2\pi R[2\delta(\Omega) - \delta(\Omega + \frac{4\pi n_0 L\upsilon}{c}) - \delta(\Omega - \frac{4\pi n_0 L\upsilon}{c})],$$

wherein jω is a frequency domain independent variable; a center point of a function is located at zero and $$\Omega = \pm \frac{4\pi n_0 L\upsilon}{c};$$

an angular frequency is set to $$\Omega_1 = \frac{4\pi n_0 L\upsilon}{c};$$

a spectrum in the frequency domain is discretized to further obtain:

$$I(n) = \{2R[1 - \cos(n_0(Lk_0 + \frac{L\Delta kn}{N}) + \varphi_0)]\}I_0,$$

wherein $k_0$ represents a wavenumber corresponding to a starting wavelength of the F-P spectrum, within a wavenumber range of $\Delta k = k_1 - k_0$; $k_1$ represents an ending wavenumber of the F-P spectrum; discrete Fourier transform is performed on a discretization formula:

$$F(m) = \sum_0^{N-1} 2R \cdot \exp[i(n_0(Lk_0 + \frac{L\Delta kn}{N}) + \varphi_0)] \cdot \exp(-i\frac{2\pi mn}{N}),$$

m=0, 1, 2, .... N−1 to find an abscissa $m_1$ corresponding to |F(m)| equal to an extreme point; $m_1$=0, 1, 2, .... N−1, obtaining a frequency $$\omega_1 = \frac{2\pi m_1}{N} = \Omega_1 \Delta \nu$$

and obtaining a cavity length calculation formula $$L = \frac{cm_1}{2n_0 N \Delta \nu};$$

a wavelength interval is $$\Delta \nu = \frac{c}{\lambda} - \frac{c}{\lambda + \delta\lambda} \approx \frac{c\delta\lambda}{\lambda_B^2};$$

δλ is a frequency parameter; $\lambda_B$ represents the center wavelength of the light emitted by the optical path module 32; and the cavity length calculation formula is rewritten as $$L = \frac{m_1 \lambda_B^2}{2n_0 N \delta\lambda},$$

m=0, 1, 2, .... N−1.

Since the discrete Fourier transform has the problem of low resolution, an arctan function is usually used in a process of calculating a phase by a computer, and a phase result of the arctan function is limited between −π and π in the computer. An actual phase is an integral multiple of a result 2π of the arctan function. This is phase wind-up. Since a Fourier transform phase spectrum has phase wind-up, a difference between the Fourier transform phase spectrum and the phase calculated by the above formula is an integral multiple of 2π. The actual phase is $\varphi(m_1)+2\pi a$, and the phase after discrete Fourier transform is $$\varphi(m_1) + 2\pi a = \frac{2\pi m_1 k_0}{k_1 - k_0} + \varphi_0.$$

a is a positive real number. In the actual calculation process, value a obtained is not an integer.

$$a = \frac{m_1 k_0}{k_1 - k_0} + \frac{\varphi_0}{2\pi} - \frac{\varphi(m_1)}{2\pi}$$

is obtained through calculation, and a is rounded off to obtain $$m_1 = \frac{k_1 - k_0}{k_{02}}(\frac{\varphi(m_1)}{2\pi} - \frac{\varphi_0}{2\pi} + [a]).$$

[●] means rounding off. The cavity length L is obtained by substituting m1 into the cavity length calculation formula.

The above describes the preferred embodiments of the present invention and is not intended to limit the present invention. Any modification, equivalent replacement, and improvement made within the spirit and scope of the present invention shall fall within the protection scope of the present invention.

What is claimed is:

1. A wireless fractional flow reserve (FFR) monitor, comprising a temperature self-compensation interventional optical fiber pressure guidewire, a power module (31), an optical path module (32), a circuit module (33), a signal processing module (34), a wireless communication module (35), and a touch display module (36);

wherein the temperature self-compensation interventional optical fiber pressure guidewire comprises: a first guidewire section (101), a second guidewire section (102), and a third guidewire section (103), sequentially arranged and each having a hollow interior, and a fiber bragg grating (FBG)-Fabry-Perot (FP) cascaded optical fiber sensor (104);

wherein the first guidewire section (101) is configured to guide the second guidewire section (102) and the third guidewire section (103) in a blood vessel;

the second guidewire section (102) and the third guidewire section (103) are internally hollow and are communicated to each other;

the FBG-FP cascaded optical fiber sensor (104) is arranged inside the second guidewire section (102) and extends towards an inside of the third guidewire section (103); the FBG-FP cascaded optical fiber sensor (104) comprises a multimode optical fiber (203), a hollow optical fiber, and a single-mode optical fiber (201) which are arranged in sequence; an FBG is arranged on the single-mode optical fiber (201); the FBG-FP cascaded optical fiber sensor (104) is configured to simultaneously measure a temperature signal and a pressure signal inside the blood vessel;

outer diameters of the first guidewire section (101), the second guidewire section (102), and the third guidewire section (103) are identical, but inner diameters are not completely identical; the first guidewire section (101) has the outer diameter of 0.36 mm and a length of 30 mm; the second guidewire section (102) has the inner diameter of 0.3 mm, the outer diameter of 0.36 mm, and a length of 300 to 500 mm: and the third guidewire section (103) has the inner diameter of 0.18 mm, the outer diameter of 0.36 mm, and a length of 1,000 to 1,500 mm;

wherein the power module (31) is electrically connected to the optical path module (32), the circuit module (33), the signal processing module (34), the wireless communication module (35), and the touch display module (36) respectively, to provide working power;

the optical path module (32) provides a sweep-frequency optical signal for the temperature self-compensation interventional optical fiber pressure guidewire and receives an optical signal output by the temperature self-compensation interventional optical fiber pressure guidewire;

the circuit module (33) is electrically connected to the optical path module (32); the circuit module (33) is further optically connected to the temperature self-compensation interventional optical fiber pressure guidewire, and is configured to drive the optical path module (32) to work and receive the optical signal output by the temperature self-compensation interventional optical fiber pressure guidewire, and performs photoelectric conversion and signal preprocessing on the optical signal;

the signal processing module (34) is electrically connected to an output end of the circuit module (33), and is configured to perform steps of data smoothing, adaptive threshold segmentation of an FBG/F-P spectrum, obtaining of a center wavelength of an FBG spectrum based on a peak detection algorithm, and calculating a cavity length of an F-P cavity based on a cavity length demodulation algorithm on a preprocessed signal output by the circuit module (33);

the wireless communication module (35) is respectively communicatively connected to an output end of the signal processing module (34) and the touch display module (36), and sends the center wavelength, obtained by the signal processing module (34), of the FBG spectrum of the FBG-FP cascaded optical fiber sensor and the cavity length, obtained by the signal processing module (34), of the F-P cavity of the FBG-FP cascaded optical fiber sensor to the touch display module (36) through wireless transmission; and the touch display module (36) receives data sent by the wireless communication module (35), displays, in real time, the center wavelength of the FBG spectrum and the cavity length of the F-P cavity, which are output and demodulated by the FBG-FP cascaded optical fiber sensor, further calculates a temperature and pressure inside a blood vessel according to a sensitivity of the FBG-FP cascaded optical fiber sensor, displays and outputs the temperature and the pressure.

2. The wireless FFR monitor according to claim 1, wherein the optical path module (32) comprises a superluminescent light-emitting diode (SLED) laser device (321), an optical isolator (322), a tunable FP filter (323), an optical splitter (324), and at least one optical circulator (325);

an output end of the SLED laser device (321) is optically connected to an input end of the optical isolator (322) to output broad-spectrum laser;

an output end of the optical isolator (322) is optically connected to an input end of the tunable FP filter (323);

an output end of the tunable FP filter (323) is connected to an input end of the optical splitter (324), to tune the input broad-spectrum laser into a periodic narrowband sweep-frequency pulse light source and input the light source into the optical splitter (324);

an output end of the optical splitter (324) is connected to a first end of the at least one optical circulator (325), to divide the sweep-frequency pulse light source output by the tunable FP filter (323) into a plurality of components for outputting;

the at least one optical circulator (325) comprises the first end, a second end, and a third end; the first end is unidirectionally communicated to the second end; the second end is unidirectionally communicated to the third end; the second end of the at least one optical circulator (325) is in optical communication with the FBG-FP cascaded optical fiber sensor (104) in the temperature self-compensation interventional optical fiber pressure guidewire in a one-to-one correspondence manner; the third end of the at least one optical circulator (325) is in optical communication with a third end of the circuit module (33); and the second end of the at least one optical circulator (325) outputs the sweep-frequency pulse light source into the FBG-FP cascaded optical fiber sensor (104), and outputs a reflected light signal of the FBG-FP cascaded optical fiber sensor (104) into the circuit module (33) through the third end of the at least one optical circulator (325).

3. The wireless FFR monitor according to claim 2, wherein the circuit module (33) comprises a photodetector (331), a signal conditioning circuit (332), a signal acquisition circuit (333), and a constant current drive and constant temperature control circuit (334);

the photodetector (331) is optically connected to the third end of the at least one optical circulator (325) to convert the reflected light signal of the FBG-FP cascaded optical fiber sensor (104) into an electrical signal; an output end of the photodetector (331) is electrically connected to an input end of the signal conditioning circuit (332);

the signal conditioning circuit (332) is configured to amplify and filter the electrical signal output by the photodetector (331); an output end of the signal conditioning circuit (332) is electrically connected to an input end of the signal acquisition circuit (333);

the signal acquisition circuit (333) performs analog-to-digital conversion on an amplified and filtered electrical signal; an output end of the signal acquisition unit is electrically connected to an input end of the signal processing module (34); the signal conditioning circuit (332) and the signal acquisition circuit (333) jointly preprocess the electrical signal;

the constant current drive and constant temperature control circuit (334) is connected to the SLED laser device (321) to perform constant current drive and constant temperature control on the laser device, so that the SLED laser device (321) achieves stable outputting; and the constant current drive and constant temperature control circuit (334) is further communicatively connected to the signal processing module (34).

4. The wireless FFR monitor according to claim 3, wherein the signal processing module (34) comprises a main control chip, and working content of the main control chip is:

A) data smoothing: a moving average filtering method is selected for data smoothing and filtering, and a calculation formula is as follows:

$$y[n] = \frac{1}{M}\sum_{k=0}^{N-1} x[n-k],$$

wherein x[n−k] corresponds to a signal sequence containing N pieces of data; k=0, 1, ... N−1, wherein n is data to be smoothed; in moving average filtering performs filtering by sliding a window with a fixed length of M on the signal sequence and calculating an average value of data within the window, to eliminate noise of a preprocessed electrical signal;

B) adaptive threshold segmentation of an FBG/F-P spectrum: in order to separate an FBG spectrum in a reflected spectrum of the FBG-FP cascaded optical fiber sensor (104) from an F-P spectrum in the reflected spectrum of the FBG-FP cascaded optical fiber sensor (104), hilbert transform is selected to segment a spectral peak region of FBG spectrum data to respectively obtain the FBG spectrum and the F-P spectrum;

C) obtaining of a center wavelength of the FBG spectrum based on a peak-detection algorithm: a Gaussian polynomial fitting method is used to identify a peak value of the FBG spectrum corresponding to the reflected light signal in the FBG-FP cascaded optical fiber sensor (104); and D) calculation of the cavity length of the F-P cavity based on the cavity length demodulation algorithm: a demodulation algorithm that combines fast Fourier transform with all-phase information to calculate the cavity length of the optical fiber F-P cavity.

5. The wireless FFR monitor according to claim 4, wherein the Gaussian polynomial fitting method is used to identify the peak value of the FBG spectrum corresponding to the reflected light signal in the FBG-FP cascaded optical fiber sensor (104); a Gaussian polynomial for the peak value of the FBG spectrum is:

$$I(\lambda) = I_0 \exp\left[-4\ln 2\left(\frac{\lambda - \lambda_b}{\Delta\lambda_b}\right)^2\right],$$

wherein $I_0$ is an optical intensity of reflected light of the FBG-FP cascaded optical fiber sensor (104); $\lambda$ is a wavelength of light emitted by the optical path module (32); $\lambda_b$ is a wavelength of the reflected light signal; $\Delta\lambda_b$ is a 3 dB bandwidth of the reflected light signal; logarithms are taken from both sides the Gaussian polynomial to obtain $$\ln I(\lambda) = -\left(4\ln\frac{\lambda_b^2}{\Delta\lambda_b^2} - \ln I_0\right) + 8\ln 2\frac{\lambda_b}{\Delta\lambda_b^2}\lambda - 4\ln 2\frac{1}{\Delta\lambda_b^2}\lambda^2,$$

which is rewritten as general polynomials:

$$\ln I(\lambda) = P(\lambda) = p_2\lambda^2 + p_1\lambda + p_0,\ p_2 = -4\ln 2\frac{1}{\Delta\lambda_b^2},$$

$$p_1 = 8\ln 2\frac{\lambda_b}{\Delta\lambda_b^2},\ p_0 = -\left(4\ln\frac{\lambda_b^2}{\Delta\lambda_b^2} - \ln I_0\right);$$

when a first derivative of the polynomial is zero which is calculated by using a least square method, a peak value position of the FBG spectrum is obtained by using $$\lambda_b = \frac{-p_1}{2p_2}.$$

6. The wireless FFR monitor according to claim 5, wherein specific content of selecting the demodulation algorithm that combines fast Fourier transform with all-phase information to calculate the cavity length of the optical fiber F-P cavity is:

the F-P spectrum is obtained by removing the FBG spectrum from a reflection spectrum in the FBG-FP cascaded optical fiber sensor (104); an interference light signal of the F-P cavity is:

$$I_R = 2R\left[1 - \cos\left(\frac{4\pi n_0 L}{\lambda} + \varphi_0\right)\right]I_0;$$

an optical frequency $\upsilon = c/\lambda$ is used; the above formula is rewritten as $$I_R = 2R\left[1 - \cos\left(\frac{4\pi n_0 L\upsilon}{c} + \varphi_0\right)\right]I_0,$$

wherein R is a reflectivity of two ends of the F-P cavity; c is a speed of light; L is the cavity length of the F-P cavity; $n_0$ is a refractive index of a medium in the F-P cavity; $\varphi_0$ is an initial phase of the F-P spectrum; fast Fourier transform is performed on a formula of interference light signal to obtain:

$$F(j\omega) = 2\pi R\left[2\delta(\Omega) - \delta\left(\Omega + \frac{4\pi n_0 L\upsilon}{c}\right) - \delta\left(\Omega - \frac{4\pi n_0 L\upsilon}{c}\right)\right],$$

wherein $j\omega$ is a frequency domain independent variable; a center point of a function is located at zero and $$\Omega = \pm\frac{4\pi n_0 L\upsilon}{c};$$

an angular frequency is set to $$\Omega_1 = \frac{4\pi n_0 L\upsilon}{c};$$

a spectrum in the frequency domain is discretized to further obtain:

$$I(n) = \left\{2R\left[1 - \cos\left(n_0\left(Lk_0 + \frac{L\Delta kn}{N}\right) + \varphi_0\right)\right]\right\}I_0,$$

wherein $k_0$ represents a wavenumber corresponding to a starting wavelength of the F-P spectrum, within a wavenumber range of $\Delta k = k_1 - k_0$; $k_1$ represents an ending wavenumber of the F-P spectrum; discrete Fourier transform is performed on a discretization formula:

$$F(m) = \sum_{0}^{N-1} 2R \cdot \exp\left[i\left(n_0\left(Lk_0 + \frac{L\Delta kn}{N}\right) + \varphi_0\right)\right] \cdot \exp\left(-i\frac{2\pi mn}{N}\right),$$

m=0, 1, 2, ... N−1 to find an abscissa m, corresponding to |F(m)| equal to an extreme point; $m_1$=0, 1, 2, ... N−1, obtaining a frequency $$\omega_1 = \frac{2\pi m_1}{N} = \Omega_1 \Delta v$$

and obtaining a cavity length calculation formula $$L = \frac{cm_1}{2n_0 N \Delta v};$$

a wavelength interval is $$\Delta v = \frac{c}{\lambda} - \frac{c}{\lambda + \delta\lambda} \approx \frac{c\delta\lambda}{\lambda_B^2};$$

$\delta\lambda$ is a frequency parameter; $\lambda_B$ represents the center wavelength of the light emitted by the optical path module (32); and the cavity length calculation formula is rewritten as $$L = \frac{m_1 \lambda_B^2}{2n_0 N \delta\lambda}.$$

7. The wireless FFR monitor according to claim 1, wherein the wireless communication module (35) comprises an ESP32 main controller; and the ESP32 main controller is configured to wirelessly transmit; the center wavelength of the FBG spectrum and the cavity length of the F-P cavity, which are obtained by the signal processing module (34), to the touch display module (36) through a message queuing telemetry transport (MQTT) protocol.

\* \* \* \* \*